K. ENGEL.
PROCESS OF MAKING BOOTS AND SHOES.
APPLICATION FILED AUG. 2, 1915. RENEWED APR. 14, 1920.
1,360,278.   Patented Nov. 30, 1920.
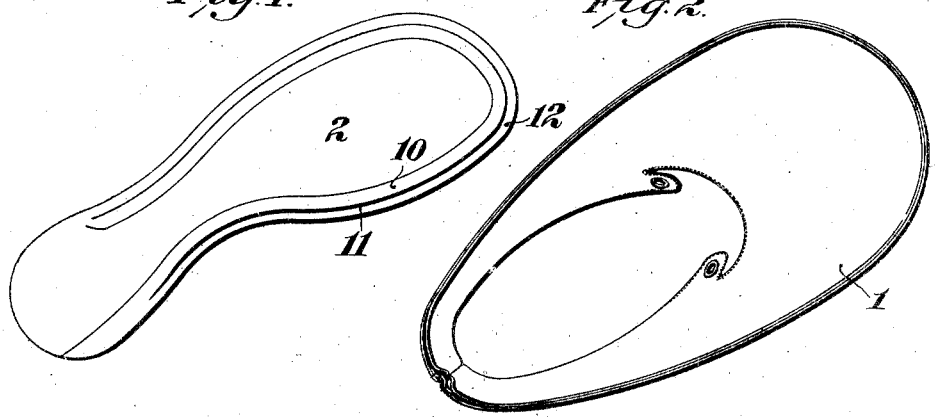
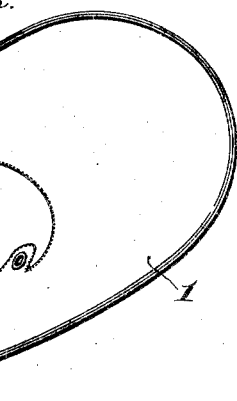
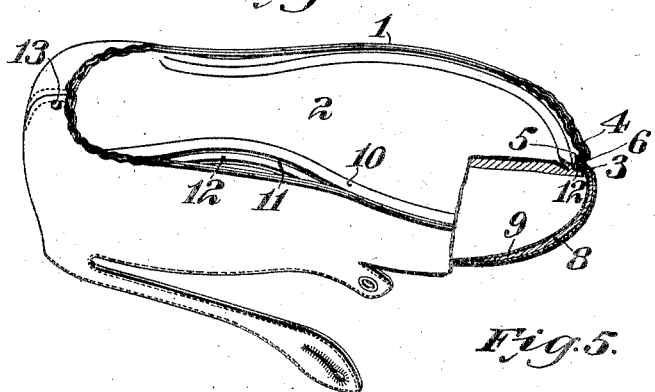
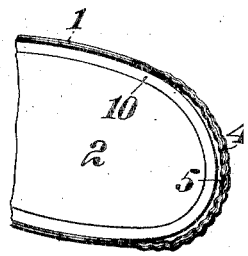
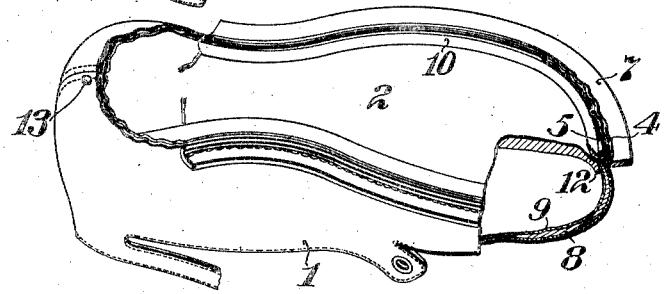
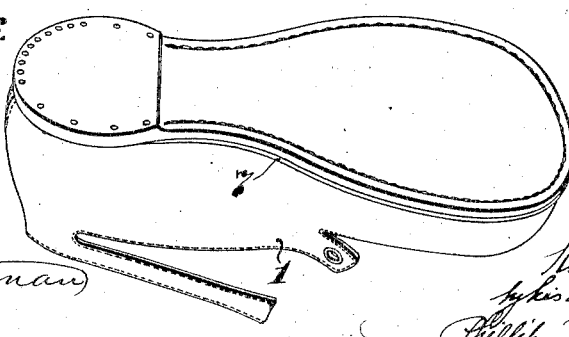

UNITED STATES PATENT OFFICE.

KARL ENGEL, OF ARLINGTON HEIGHTS, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

PROCESS OF MAKING BOOTS AND SHOES.

1,360,278.                Specification of Letters Patent.       Patented Nov. 30, 1920.

Application filed August 2, 1915. Serial No. 43,239. Renewed April 14, 1920. Serial No. 373,932.

*To all whom it may concern:*

Be it known that I, KARL ENGEL, a citizen of the United States, residing at Arlington Heights, in the county of Middlesex and State of Massachusetts, have invented certain new and useful Improvements in Processes of Making Boots and Shoes; and I do hereby declare the following to be a full, clear, and exact description of the invention, such as will enable others skilled in the art to which it appertains to make and use the same.

This invention relates to a process of making shoes and more particularly to a process of making welted and turned shoes.

In the present commercial process of making welted and turned shoes after the upper and insole have been prepared for assembling and have been assembled upon a last the upper is lasted or stretched tightly about the last so as to cause it to conform substantially to the shape of the last at all points by gripping the lower marginal portion of the upper and drawing it with considerable force over the marginal portion of the insole and the upper is then secured in position at its margin by temporary fasteners. The lasting operation is performed by hand or by a machine especially constructed for this purpose. In this process of making shoes the upper is cut so as to provide a considerable surplus of material at its lower margin which is essential in order to enable the lasting grippers to secure a firm grip on the upper during the lasting operation. This surplus or excess in the material of the upper projecting beyond the inseam after the inseam is sewn is trimmed off in the inseam trimming operation. The upper leather is expensive and the surplus material in the upper which is trimmed off and wasted adds considerable to the expense of the shoe.

One object of the present invention is to provide a process of making welted and turned shoes by which such shoes in every respect as good as those made in accordance with the present commercial process may be manufactured with a considerable saving in the cost of production.

Another object of the invention is to provide a process of making welted and turned shoes by which the waste in the upper leather incident to the present commercial process may to a large extent be eliminated.

With these and other objects in view the invention consists in the process hereinafter described and defined in the claims.

The invention is illustrated and described in this application as applied to the making of welted and turned shoes. Certain features of the invention, however, might be applied to the making of other classes of shoes, and it is to be understood that except as defined in the claims the invention is not limited in its application to the making of any particular class of shoes.

In the accompanying drawings are illustrated the parts of a welted shoe at different stages in the manufacture of the shoe in accordance with applicant's process.

In the drawings, Figures 1 and 2 are plan views showing the insole and upper before they are assembled and before the upper is molded; Fig. 3 is a perspective view partly in section of the insole and upper assembled ready to be sewn showing the manner in which the upper is molded prior to placing the insole in position; Fig. 4 is a detail plan view of the toe portion of the insole and upper when assembled as in Fig. 3; Fig. 5 is a perspective view partly in section, illustrating the shoe after the inseam is sewn; and Fig. 6 is a perspective view showing the completed welted shoe.

In preparing the upper of the shoe for attaching it to the insole in accordance with applicant's process, the upper, as indicated at 1, is cut substantially to the size which it is to have in the finished shoe, neglecting the stretching or lasting to which the upper is subjected after the insole, indicated at 2, and the upper are attached together at their marginal portions by permanent fastenings. Before the upper and insole are assembled the toe portion of the upper and preferably the heel portion also are molded into shape as illustrated in Fig. 3. In the upper molding operation the toe portion of the upper above the line along which the stitches or other fastenings are to be inserted to attach the upper to the insole is molded and stretched so as to give it substantially the shape of the last and the marginal portion of the upper at the toe is formed in plaits or folds substantially the same as are formed in the lasting operation of the ordinary process of manufacture of welted and turned shoes. As will be noted from an inspection of Fig. 3, the upper is molded inwardly at 3 so that it will lie properly over the margin of the sole and is turned outwardly at 4 thereby forming a convex shoulder 5 for engagement with the shoulder at the outer margin of the between substance of the sole and a crease 6 in which the margin of the welt, indicated at 7, Fig. 5, is laid in attaching the welt and upper to the insole. This crease also determines the position of the line of fastenings by which the welt and upper are attached to the insole, the fastenings being inserted through the bottom of the crease as shown in Fig. 5. This molding of the upper amounts in effect to a preliminary lasting operation in which the toe of the unlasted upper is molded substantially into the shape of the toe of the upper of a lasted shoe. The heel of the upper is molded as shown in Fig. 3 with the lower marginal portion of the upper shaped at an angle to the upper portion thereof so that it will lie over the heel of the insole. The toe of the upper is molded after the toe box 8, if such is used, has been inserted between the lining 9 and the upper leather, and the upper leather, toe box and lining are all molded together into the shape shown in the drawings. In order to cause the upper to hold its shape after having been molded and especially to retain the folds or plaits formed in the marginal portion thereof, size or cement is inserted preferably between the toe box and the upper leather and the forms by which the upper is molded are heated so that the upper after being removed from the forms sets in the position in which it is molded. This molding of the upper is an important feature of applicant's process since it shapes the marginal portion of the upper so that it will fit properly about the toe of the insole when the upper and insole are assembled and so that it will conform accurately to the last when the last is inserted.

The insole employed may be constructed in accordance with any one of several well-known types. The insole shown in the drawing is provided with a channel lip 10 which is formed by an oblique cut extending about the marginal portion of the insole and has the outer portion of its margin cut away in a plane parallel with the plane of the insole forming a shoulder 11, and a thin flexible portion 12 at the outer edge of the insole which is ordinarily termed the feather.

In assembling the upper and insole the insole is placed inside the upper with the heel of the insole beneath the inwardly molded portion of the upper at the heel and the heel of the upper is preferably attached to the heel of the insole by a tack 13 or other fastening means. When the insole and upper are thus assembled they are ready to be attached together, by stitches passing through the between substance of the insole and the margin of the upper. The stitching together of the upper and insole is performed with the upper in an unlasted condition, or without the placing of a last or other supporting form within the upper. In the operation of sewing the upper to the insole the upper is placed over the edge of the insole and the edge of the upper is preferably gaged so that it projects a substantially uniform distance beyond the base of the shoulder of the between substance or beyond the stitch line, such that practically no excess or surplus material of the upper is left projecting beyond the stitches after the inseam is sewn. The sewing of the upper to the insole together with the welt in this manner may be performed upon a machine constructed as illustrated and described in the application of Frederic Bertrand, Serial No. 861,215, filed September 11, 1914. As fully described in said application, the work positioning devices of the said machine operate to locate progressively, the different parts of the marginal portion of the upper and the corresponding parts of the between substance of the insole in proper relation and to present the same in such relation to the stitch forming devices as the point of operation is transferred about the shoe. The sewing of the upper and welt to the insole may, however, be performed upon any other suitably constructed machine, or it may be performed by hand.

After the upper and sole or the welt upper and insole are attached together by the inseam, the upper is lasted by driving a last which is somewhat larger than the size of the unlasted shoe into the shoe thereby stretching the upper into shape so that it conforms accurately to the shape of the last. Obviously in driving a last into the shoe, the upper is stretched as a whole longitudinally and is also stretched transversely between the molded toe and heel portions. This method of lasting the upper has the advantage that the upper is stretched uniformly, or substantially so, at all points instead of being stretched merely at the points seized by the lasting pincers or grippers as in the ordinary operation of lasting. The insole is preferably cut to the exact size of the bottom of the last so that when the last is inserted the margin of the upper at its junction with the edge of the insole hugs tightly to the bottom of the last. The last is preferably driven into the shoe immediately after the inseam is sewn in the case of a welted shoe, or immediately after the shoe is turned in the case of a turn shoe, but this operation may be deferred if desired until a later stage in the manufacture of the shoe. After the last has been inserted, the shoe may be finished in substantially the same manner as in the ordinary commercial process of manufacture except that the inseam trimming operation is eliminated It will be noted on inspection of Fig. 5 that the welt, upper and insole are not attached by the inseam completely about the shoe but that the upper is left unattached to the insole about the heel except at the point where the tack 13 is inserted. In finishing the shoe after the last has been inserted in the shoe the portions of the upper which are left unattached to the insole are drawn taut over the heel of the last and turned down over the outer face of the insole in substantially the same manner as in the ordinary process of shoe manufacture. These portions of the upper may be secured to the insole in the usual manner by driving a row of tacks through the margin of the upper and through the insole.

In cutting the upper of the shoe substantially to the size which it is to have in the finished shoe, and sewing it to the sole in such a manner that no surplus material of the upper is left projecting beyond the inseam, the upper stock which is trimmed off in the upper trimming and inseam trimming operations of the commerial process is saved. It has been found in actual practice that the saving in upper stock brought about by applicant's process may be as high as 33% of the amount required in the commercial process of manufacture of welted and turned shoes. In addition to the saving in the upper stock which is brought about by applicant's process of manufacture of shoes, a considerable saving in lasts also results from this process. In the ordinary commercial process of the manufacture of welted and turned shoes, the upper and sole remain upon the last from the time when they are first assembled until the shoe is finished while in applicant's process the last is not inserted until after the sewing of the inseam. Since the shoe remains on the last a much shorter time in applicant's process than in the commercial process, the number of lasts which are required in a shoe factory in which shoes are made by applicant's process is much less than the number required in a factory in which the commercial process is followed. Applicant's process of manufacture of welted and turned shoes also reduces considerably the amount of labor required in the making of the shoe which also results in a reduction of the cost of manufacture. In his process, applicant eliminates the pulling over and the lasting operation, the tack driving operation, the tack pulling and re-setting operation, and ordinarily the inseam trimming operation. In case for any reason there is any surplus material at any point along the inseam this may be trimmed off either before or after the last is inserted. The only two operations included in this process which do not form a part of the regular commercial process are the upper molding operation and the operation of driving the last into the shoe which obviously require much less labor and time than the operations which are eliminated. Welted and turned shoes made in accordance with this process have substantially the same construction and are in all respects as good as the shoes made by the commercial process, and the shoes may be manufactured at a greatly reduced cost due to the reduction in the amount of stock, the number of lasts and the amount of labor required.

It is to be understood that the term "upper" is employed in its generic sense in the claims and may include the usual parts such as upper leather, lining and toe and heel stiffeners.

It is also to be understood that the term "unlasted" as employed in the claims signifies that the parts are not applied to a last and does not indicate that the parts have received no preliminary stretching or shaping.

Having explained the nature and object of the invention and having specifically described the preferred embodiment thereof, what is claimed is;—

1. The process of making welted and turned shoes, which consists in cutting an upper substantially to the size which it is to have in the finished shoe, placing the marginal portion of the unlasted upper over the edge of a sole, gaging the edge of the upper relative to the between substance of the sole so that the upper projects a substantially uniform distance beyond the stitch line of the between substance, and attaching the upper while without interior support to the sole by stitches passing through the margin of the upper and the between substance of the sole.

2. The process of making welted and turned shoes, which consists in cutting an upper substantially to the size which it is to have in the finished shoe, placing the margin of the unlasted upper over the edge of a sole, gaging the edge of the upper and the between substance of the sole in predetermined relations, and attaching the upper while without interior support to the sole by stitches passing through the margin of the upper and the between substance of the sole.

3. The process of making welted shoes, which consists in cutting an upper substantially to the size which it is to have in the finished shoe, placing the edge of the upper over the edge of an insole, gaging the edge of the upper relative to the stitch line of the between substance so that the upper projects a substantially uniform distance beyond the said line, laying a welt along the outer margin of the upper, and attaching the welt and upper to the sole by stitches passing through the margins of the welt and upper and through the between substance of the sole.

4. The process of making welted and turned shoes, which consists in cutting an upper substantially to the size which it is to have in the finished shoe, molding the upper at one or more points, placing the margin of the unlasted upper over the edge of a sole, and attaching the upper to the sole by stitches passing through the margin of the upper and through the between substance of the sole.

5. The process of making welted and turned shoes, which consists in cutting an upper substantially to the size which it is to have in the finished shoe, molding the upper at one or more points, placing the margin of the unlasted upper over the edge of a sole, gaging the edge of the upper so that it projects a substantially uniform distance beyond the outer stitch line of the between substance of the sole, and attaching the upper to the sole by stitches passing through the marginal portion of the upper and through the between substance of the sole.

6. The process of making welted and turned shoes, which consists in cutting an upper substantially to the size which it is to have in the finished shoe, placing the margin of the unlasted upper over the edge of a sole, gaging the edge of the upper and the between substance of the sole in predetermined relations, attaching the upper while without interior support to the sole by stitches passing through the margin of the upper and through the between substance of the sole and driving a last into the attached upper and sole.

7. The process of making welted and turned shoes, which consists in molding an upper at one or more points, placing the margin of the upper over the edge of a sole, attaching the upper to the sole by stitches passing through the margin of the upper and through the between substance of the sole, and driving a last into the attached upper and sole.

8. The process of making welted and turned shoes, which consists in molding an upper at one or more points to give it substantially the form of a lasted welted or turned shoe upper, placing the margin of the upper over the edge of a sole and attaching the upper to the sole by stitches passing through the margin of the upper and through the between substance of the sole.

9. The process of making welted shoes, which consists in molding an upper at one or more points to give it substantially the shape of a lasted welted shoe upper, placing the margin of the upper over the edge of a sole, laying a welt along the margin of the upper and attaching the welt, upper and sole together by stitches passing through the margins of the welt and upper and through the between substance of the sole.

10. The process of making shoes which consists in molding the marginal portion of an upper at the toe to give it the shape of a lasted upper of a welted or turned shoe and to form a crease determining the position of the line of fastenings by which the upper and a sole are attached, attaching the upper to the between substance of the sole in an unlasted condition by fastenings passing through the bottom of the crease in the toe portion of the upper, and inserting a last in the attached upper and sole.

11. The process of making welted shoes which consists in molding an upper at the toe to give it the shape of a lasted welt shoe upper and to form a crease for the reception of the inner margin of a welt, attaching the welt and upper to an insole in an unlasted condition by fastenings passing through the bottom of the crease in the upper, and inserting a last in the attached upper and insole.

12. The process of making shoes which consists in molding an upper at one or more points to give it the shape of a lasted shoe upper, attaching the upper to a sole in an unlasted condition by fastenings lying substantially in a plane parallel with the plane of the sole, and inserting a last in the attached upper and sole.

13. The process of making welted and turned shoes which consists in forming a sole having a sewing rib and a marginal portion projecting beyond the rib, molding an upper at one or more points to give it the form of a lasted shoe upper and to shape the marginal portion thereof to lie over and fit closely to the projecting margin of the sole, placing the margin of the upper over the projecting margin of the sole, and attaching the upper to the rib of the sole by fastenings passing through the margin of the upper and the said rib.

14. The process of making welted and turned shoes which consists in assembling an upper and a sole, placing the margin of the upper over the outer face of the marginal portion of the sole, gaging the edge of the upper and the between substance of the sole in predetermined relations, and attaching the upper to the sole by stitches passing through the margin of the upper and the between substance of the sole without the use of a last or other supporting form within the upper and sole.

15. The process of making welted and turned shoes which consists in assembling an upper and a sole, placing the margin of the upper over the outer face of the marginal portion of the sole, progressively locating different parts of the marginal portion of the upper and corresponding parts of the between substance of the sole in predetermined relations, and attaching the upper to the sole by stitches passing through the margin of the upper and the between substance of the sole.

16. The process of making welted and turned shoes which consists in molding an upper at one or more points to give it the shape of a lasted, welted or turned shoe upper, assembling the upper and a sole, locating the edge of the upper and the between substance of the sole in predetermined relations, and attaching the upper to the sole by permanent fastenings without the use of a last or other supporting sole within the upper.

17. The process of making welted and turned shoes which includes as a step the molding of the upper at one or more points so that its marginal portion will lie over and fit closely to the outer face of the feather of a sole and to produce a shoulder adapted to fit the sewing rib of the sole and an upstanding marginal flange.

18. The process of making shoes which includes as a step the molding of the toe of an upper in a curve to fit about the outer edge of the toe of a sole and to produce an inwardly deflected portion adapted to overlie the outer face of the feather, a shoulder to fit the sewing rib of the sole and an upstanding marginal flange.

19. The process of making shoes which comprises forming one end of an upper with an inturned portion to overlie the outer face of a sole, assembling and relatively locating the upper and a sole with the sole beneath the inturned portion of the upper, securing the inturned portion of the upper to the sole at one end of the sole only off the last on which the shoe is to be partially manufactured, and employing the assembled upper and sole as a unit in one or more subsequent steps in the manufacture of the shoe.

20. The process of making shoes which includes as a step, molding the toe of an upper to give it substantially its final shape, to determine the junction of the sides and bottom thereof in the shoe and to produce an upstanding flange at the margin of the upper adapted to fit the curved rib of an insole at its toe.

21. The process of making shoes which comprises molding the upper to form thereon an inturned end flange, assembling the upper and a sole, attaching one end of the sole to said end flange off the last upon which the shoe is to be partially manufactured, and thereafter permanently securing together other parts of the upper and sole.

22. The process of making shoes which comprises molding an upper at one or more points to a shape corresponding to that of the last upon which the shoe is to be partially manufactured and forming thereon an inturned portion to overlie the outer face of a sole, assembling the upper and a sole and relatively locating the same with the sole within the inturned portion of the upper, securing relatively small portions of the margins of the upper and sole together off the last before the principal attaching operation, and thereafter forming a line of fastenings about at least all portions of the margins of the upper and sole forwardly of the heel to attach the same together.

23. The process of making shoes which comprises molding the toe of an upper to a shape corresponding to that of the last upon which the shoe is to be partially manufactured and producing at the heel end of the upper an inturned flange, securing the flange to the heel end of a sole and thereafter securing permanently together other parts of the upper and sole.

24. The process of making shoes which includes as a step the molding of an upper at one or more points so that its marginal portion will conform to the edge, overlap the feather and fit to the sewing rib of a sole.

25. The process of making shoes which comprises molding the heel of an upper to form thereon an inturned flange, inserting the heel of a sole within the upper and beneath said flange, fastening said flange to the heel of the sole and thereafter securing permanently together other parts of the upper and sole.

26. The process of making shoes which comprises molding the upper at one or more points to a shape corresponding to the shape of the last upon which the shoe is to be partially manufactured and to produce thereon an inturned end flange assembling the upper and a sole and attaching said flange to one end of the sole and thereafter permanently securing together other parts of the upper and sole.

27. The process of making welted and turned shoes which comprises molding an upper at one or more points to give it the shape of a welted or turned shoe upper, assembling the upper and a sole, and securing the upper and sole together at the heel, and thereafter forming a line of fastenings through the marginal portion of the upper and the between substance of the sole to attach the same permanently together.

28. The process of making shoes which comprises molding both ends of an upper to substantially its final shape and with inturned flanges to overlie the outer face of the margin of a sole while at least the greater part of its margin is unattached to the sole, and thereafter stretching the upper while placing a last in final position therein.

29. The process of making shoes which comprises providing an upper, end portions of which are molded to substantially their final shape, with inturned flanges, and also a sole lying within and against said flanges but unattached to the upper at least along the greater part of the margin of the upper, and thereafter stretching the upper while placing a last in final position within the upper and against the sole.

30. The process of making shoes which comprises molding one end of an upper to substantially its final shape with an inturned flange, securing the flange to the outer face of a sole at one end only, and thereafter stretching the upper while placing a last in final position within the upper and against the sole.

31. The process of making shoes which comprises forming one end of an upper with an inturned portion to overlie the outer face of a sole, securing such inturned portion to the outer face of the sole at one end only, and thereafter inserting a last for subsequent operations in the manufacture of a shoe.

32. The process of making shoes which includes as a step the molding, off the last on which subsequent steps in the manufacture of a shoe are performed, of the toe of an upper in a curve to fit about the outer edge of the toe of a sole, and to produce an inwardly deflected portion adapted to overlie the outer face of the feather, a shoulder to fit the sewing rib of the sole, and an upstanding marginal flange.

33. The process of making shoes which comprises molding one end of an upper to substantially its final shape, and with an inturned flange, thereafter attaching said flange to a sole, and stretching the upper as a whole longitudinally before the shoe is completed.

34. The process of making shoes which comprises molding an upper at the toe and the heel before at least the greater portion of its margin is attached to a sole and stretching the upper transversely at points intermediate the toe and heel portions, and as a whole longitudinally before the shoe is completed.

35. The process of making shoes which comprises molding an upper at the toe and at the heel to substantially its final shape and with inturned flanges, thereafter attaching one end of a sole to one of said flanges and stretching the upper transversely at points intermediate the toe and the heel portions, and as a whole longitudinally before the shoe is completed.

KARL ENGEL.